J. Kirby,
Auger.
N° 25,512.        Patented Sep. 20, 1859.
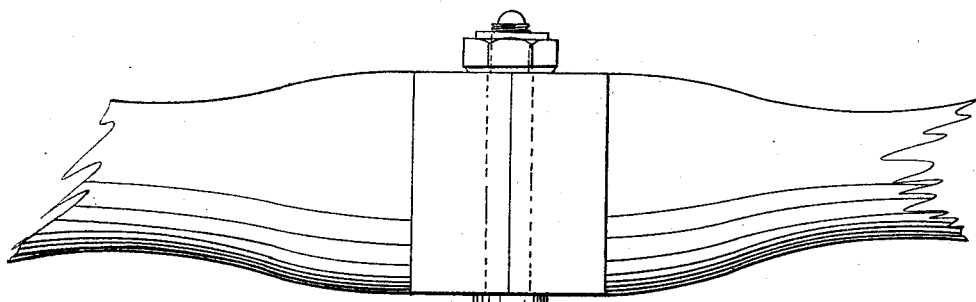
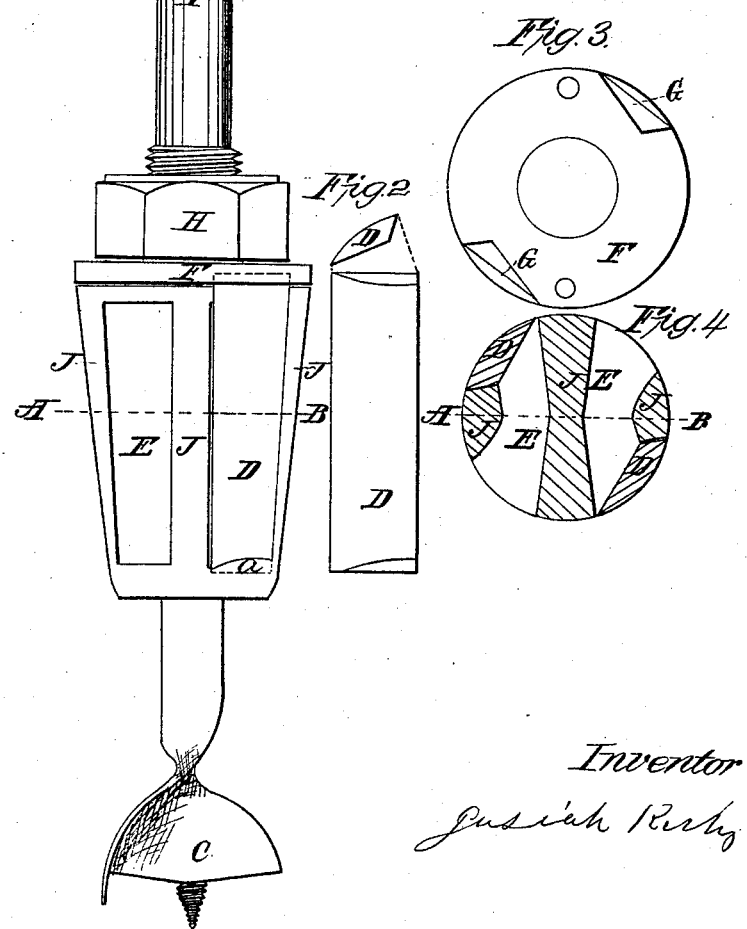
Witnesses
R. B. Stearns
Geo. A. Kelley
Inventor
Josiah Kirby

UNITED STATES PATENT OFFICE.

JOSIAH KIRBY, OF CINCINNATI, OHIO.

BUNG-HOLE BORER AND REAMER.

Specification of Letters Patent No. 25,512, dated September 20, 1859.

*To all whom it may concern:*

Be it known that I, JOSIAH KIRBY, of Cincinnati, in the county of Hamilton and State of Ohio, have invented a new and useful Tool for Boring and Reaming Bung-Holes; and I do hereby declare that the following is a full and exact description thereof, reference being had to the accompanying drawings and to the letters of reference marked thereon.

Figure 1 in the mixed drawings represents the borer and reamer in full size and completely arranged for work; Fig. 2, the bit; Fig. 3, the cap for holding bits, and Fig. 4 a cut section of bit stock showing the arrangement of the bits with the stock and throat for the delivery of shavings.

I make my bit stock A, B, Fig. 1, of iron or other suitable material giving it the required taper and making it to any convenient length that may be desired for boring a small or large hole.

C, represents auger bit connected to the stock for boring through the stave so that the reamer will enter; D, steel bits for reaming the hole after it has been bored; E, throat for shavings; J, J, J, stock; F, cap for fastening bits; H, nut screwed down on cap; I, stem for handle or brace.

In making my reamer I provide the stock with a recess on two opposite sides for the bits as seen at D, D, Fig. 4. I make my bit of steel straight and flat on the under side and turn it off round on top with the stock and bevel them off at each end as seen at *a*, Fig. 1, so that they are made to fit into beveled recess in stock and cap, as at G, G, Fig. 3. The bits being put in their places the cap F is placed on over the stem, so as to rest on the ends of the bits and the nut being screwed down tight against it they are firmly secured in their places.

I am aware that there are many old devices for boring and reaming holes in both wood and metal in almost every variety of shape, such as boring machines of various kinds and solid, fluted square, angular, semicircular and circular reamers. There is also an old and well known tool called the tap or bung borer which is in very general use; but this tool does not answer the purpose well for which it is used, it being made of a tapered sheet of steel bent into a semicircular form, with screw at the end and the forward edge shortened from the inside of circle. It eats into the wood while it crosses the grain in one direction and fails to cut, if a little dull, when it crosses in the opposite direction, thus making a rough oblong hole, but so far as my knowledge extends there is no tool in use which could be applied to smoothing out bung holes. The essential difference between my invention and all others for the purpose consists in the stock being made tapering and turned up true so as to serve as the face of a plane to prevent the bit from eating into the wood any farther than is just necessary to take off a fine shaving and smooth out the hole so that the bung will fit tight without a wrapper, and at the same time it is provided with a throat cut from one side to the other so that the shaving passes out at the opposite side of stock.

Now I do not claim the mode of fastening the bits to the stock as that may be done in any of the known ways of securing bits; but I do claim—

1. The conical shaped stock when made with a throat cut through from the edge of the bit on one side to the opposite side of the stock, so that the shavings are made to pass through the stock and out on the opposite side substantially as described.

2. I also claim the combination of the auger bit C, with reamer when made in the manner and for the purpose substantially described.

JOSIAH KIRBY.

Witnesses:
 B. B. STEARNS,
 GEO. A. KELLY.